United States Patent
Keatley

(10) Patent No.: US 8,801,036 B2
(45) Date of Patent: Aug. 12, 2014

(54) FIFTH WHEEL HITCH SUPPORT ASSEMBLY

(71) Applicant: SAF-HOLLAND, Inc., Holland, MI (US)

(72) Inventor: Justin D. Keatley, Zeeland, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 0 days.

(21) Appl. No.: 13/667,660

(22) Filed: Nov. 2, 2012

(65) Prior Publication Data

US 2013/0113182 A1 May 9, 2013

Related U.S. Application Data

(60) Provisional application No. 61/556,568, filed on Nov. 7, 2011.

(51) Int. Cl.
*B62D 21/05* (2006.01)
*B62D 53/08* (2006.01)

(52) U.S. Cl.
CPC ............ *B62D 53/0807* (2013.01); *B62D 21/05* (2013.01)
USPC ............................ 280/781; 280/433; 280/495

(58) Field of Classification Search
CPC .... B62D 21/05; B62D 21/09; B62D 53/0807; B62D 1/44
USPC .............. 280/781, 495, 433, 441, 407, 438.1
See application file for complete search history.

(56) References Cited

U.S. PATENT DOCUMENTS

| | | | | |
|---|---|---|---|---|
| 6,286,868 | B1* | 9/2001 | von Mayenburg | 280/800 |
| 7,198,282 | B2* | 4/2007 | Burchett | 280/433 |
| 7,261,322 | B2* | 8/2007 | Ito et al. | 280/781 |
| 7,789,428 | B2* | 9/2010 | Wrinkle et al. | 280/785 |
| 7,938,429 | B2* | 5/2011 | Mann et al. | 280/438.1 |
| 8,246,079 | B2* | 8/2012 | Alguera Gallego | 280/781 |
| 8,371,596 | B2* | 2/2013 | Johnson et al. | 280/124.116 |
| 2003/0047906 | A1* | 3/2003 | Hicks et al. | 280/433 |
| 2004/0021290 | A1* | 2/2004 | Hicks et al. | 280/438.1 |

* cited by examiner

*Primary Examiner* — Joseph M Rocca
*Assistant Examiner* — Daniel Yeagley
(74) *Attorney, Agent, or Firm* — Price Heneveld LLP

(57) ABSTRACT

A fifth wheel hitch mounting assembly for mounting a fifth wheel hitch plate to a vehicle frame assembly includes a first and second frame members each having substantially vertically extending mounting portions each having an inwardly facing surface, comprises a first support member adapted to couple to the inwardly facing surface of the mounting portion of the first frame member, a second support member adapted to couple to the inwardly facing surface of the mounting portion of the second frame member, a cross member extending between and coupled to the first support member and the second support member, a first mounting member coupled with a first support member and including an inwardly exposed aperture adapted to receive a mounting pin therein for pivotally coupling a fifth wheel hitch plate to the first mounting bracket, and a second mounting member coupled to the second support member and including an inwardly exposed aperture adapted to receive a mounting pin therein for pivotally coupling the fifth wheel hitch plate to the second mounting bracket.

13 Claims, 7 Drawing Sheets

FIFTH WHEEL HITCH SUPPORT ASSEMBLY

BACKGROUND OF THE INVENTION

The present invention relates to a fifth wheel mounting assembly and in particular to a novel mounting and cross member assembly for coupling a fifth wheel hitch plate to an associated vehicle frame.

Fifth wheel coupling systems are used in a wide variety of applications for coupling heavy duty trailers to associated tractors, as well as for coupling recreational vehicles with associated towing vehicles. FIG. 1 illustrates a typical prior construction of a tractor frame and a fifth wheel mounting system 10 for tractor/trailer applications. As illustrated, the tractor frame and mounting system 10 includes a pair of parallel frame rails 12 spaced apart and supported by a suspension 14, and supporting a drive train (not shown) and a fifth wheel coupling apparatus 16 for connecting a trailer to the tractor. While the frame rails 12 are illustrated as ending under a deck 17 it is noted that in the instant example the rails 12 continue forwardly of the deck 17 and extend under a cab of the tractor and support the cab and an engine of the tractor. It is further noted that the overall tractor assembly is utilized for illustrative purposes only, and that the present inventive assembly may also be incorporated into trailer assemblies.

The coupling apparatus 16 includes a fifth wheel hitch plate 20 and a mounting bracket and base plate assembly 18 configured to connect the fifth wheel hitch plate 20 to the frame rails 12. The mounting bracket and base plate assembly 18 includes a pair of brackets 22 connected to ends of a base plate 24. The base plate 24 is constructed of a planar sheet of steel that includes a pair of mounting brackets 26 extending upwardly from a top surface of the base plate 24. As illustrated, the mounting brackets 26 are fixedly welded to the base plate 24, while the base plate 24 is fixedly welded to the brackets 22. The coupling apparatus 16 is connected to the frame rails 12 by placing ends of the base plate 24 over the top surface of the frame rails 12 and by inserting fasteners (not shown) through the brackets 22 and into the frame rails 12. Therefore, the brackets 22 assist in connecting the coupling apparatus 16 to the frame rails 12 of the tractor. Each mounting bracket 26 of the mounting bracket and base plate assembly 18 includes an elongated aperture 28 therein configured to accept conventional attachment structure (not shown) for connecting the fifth wheel hitch plate 20 to the base plate 24. A separate cross-frame member 30 is located beneath the base plate 24 and extends between the frame rails 12, thereby structurally supporting the base plate 24 and the frame rails 12.

Accordingly, a fifth wheel mounting assembly is provided that decreases construction and assembly costs, while simultaneously reducing the weight and overall complexity of the assembly.

SUMMARY OF THE INVENTION

One aspect of the present invention is to provide a fifth wheel mounting assembly for mounting a fifth wheel hitch plate to a vehicle frame assembly including a first frame member having a substantially vertically extending mounting portion with an outwardly facing surface and an inwardly facing surface, and a second frame member having a substantially vertically extending mounting portion with an outwardly facing surface and an inwardly facing surface, the fifth wheel mounting assembly comprising a first support member adapted to couple to the inwardly facing surface of the mounting portion of the first frame member of the vehicle frame assembly, a second support member adapted to couple to the inwardly facing surface of the mounting portion of the second frame member of the vehicle frame assembly, and a cross member extending between and coupled to the first support member and the second support member. The fifth wheel mounting assembly further comprises a first mounting member coupled to the first support member and including an inwardly exposed aperture adapted to receive a mounting pin therein for pivotally coupling a fifth wheel hitch plate to the first mounting bracket, and a second mounting member coupled to the second support member and including an inwardly exposed aperture adapted to receive a mounting pin therein for pivotally coupling the fifth wheel hitch plate to the second mounting bracket.

Another aspect of the present invention is to provide a fifth wheel mounting assembly for mounting a fifth wheel hitch plate to a vehicle frame assembly including a first frame member having a substantially vertically extending mounting portion with an outwardly facing surface and an inwardly facing surface, and a second frame member having a substantially vertically extending mounting portion with an outwardly facing surface and an inwardly facing surface, the fifth wheel mounting assembly comprising a first support member adapted to couple to the inwardly facing surface of the mounting portion of the first frame member of the vehicle frame assembly and the inwardly facing surface of the mounting portion of the second frame member of the vehicle frame assembly, a cross member adapted to be located between the first frame member and the second frame member of the vehicle, wherein the cross member is secured to and structurally supports the first support member, a first mounting member coupled to the first support member and including an inwardly exposed aperture adapted to receive a mounting pin therein for pivotally coupling a fifth wheel hitch plate to the first mounting bracket, and a second mounting member coupled to the first support member and including an inwardly exposed aperture adapted to receive a mounting pin therein for pivotally coupling the fifth wheel hitch plate to the second mounting bracket.

Yet another aspect of the present invention is to provide a fifth wheel mounting assembly for mounting a fifth wheel hitch plate to a vehicle frame assembly including a first frame member having a substantially vertically extending mounting portion with an outwardly facing surface and an inwardly facing surface, and a second frame member having a substantially vertically extending mounting portion with an outwardly facing surface and an inwardly facing surface, the fifth wheel mounting assembly comprising a first rail member adapted to couple to the inwardly facing surface of the mounting portion of the first frame member of the vehicle frame assembly, a second rail member adapted to couple to the inwardly facing surface of the mounting portion of the second frame member of the vehicle frame assembly, a first support member adapted to be slidably coupled between the first rail member and the inwardly facing surface of the first frame member, and a second support member adapted to be slidably coupled between the second frame member and the inwardly facing surface of the second frame member. A fifth wheel mounting assembly further comprises a cross member extending between and coupled to the first support member and the second support member, a first mounting member coupled to the first support member and including an inwardly exposed aperture adapted to receive a mounting pin therein for pivotally coupling a fifth wheel hitch plate to the first mounting bracket, and a second mounting member coupled to the second support member and including an inwardly exposed aperture adapted to receive a mounting pin therein for pivotally coupling the fifth wheel hitch plate to the second mounting bracket.

Still yet another aspect of the present invention is to provide a fifth wheel mounting assembly for mounting a fifth wheel hitch plate to a vehicle frame assembly including a frame member having a substantially vertically extending mounting portion with an outwardly facing surface and an inwardly facing surface, and a second frame member having a substantially vertically extending mounting portion with an outwardly facing surface and an inwardly facing surface, the fifth wheel mounting assembly comprising a first rail member adapted to couple to the inwardly facing surface of the mounting portion of the first frame member of the vehicle frame assembly, a second rail member adapted to couple to the inwardly facing surface of the mounting portion of the second frame member of the vehicle frame assembly, a first support member adapted to be slidably coupled between the first frame member and the inwardly facing surface of the first frame member, and a second support member adapted to be slidably coupled between the second frame member and the inwardly facing surface of the second frame member, wherein the second support member is not directly coupled to the first support member by a cross member. The fifth wheel mounting assembly further comprises a first mounting member coupled to the first support member and including an inwardly exposed aperture adapted to receive a mounting pin therein for pivotally coupling a fifth wheel hitch plate to the first mounting bracket, and a second mounting member coupled to the second support member and including an inwardly exposed aperture adapted to receive a mounting pin therein for pivotally coupling the fifth wheel hitch plate to the second mounting bracket.

The present objects of the present invention are to provide a durable fifth wheel mounting assembly that includes an uncomplicated design that can be easily and quickly assembled, thereby reducing the associated manufacturing costs. The present inventive fifth wheel mounting assembly is economical to manufacture, results in a significant reduction of weight, and is particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
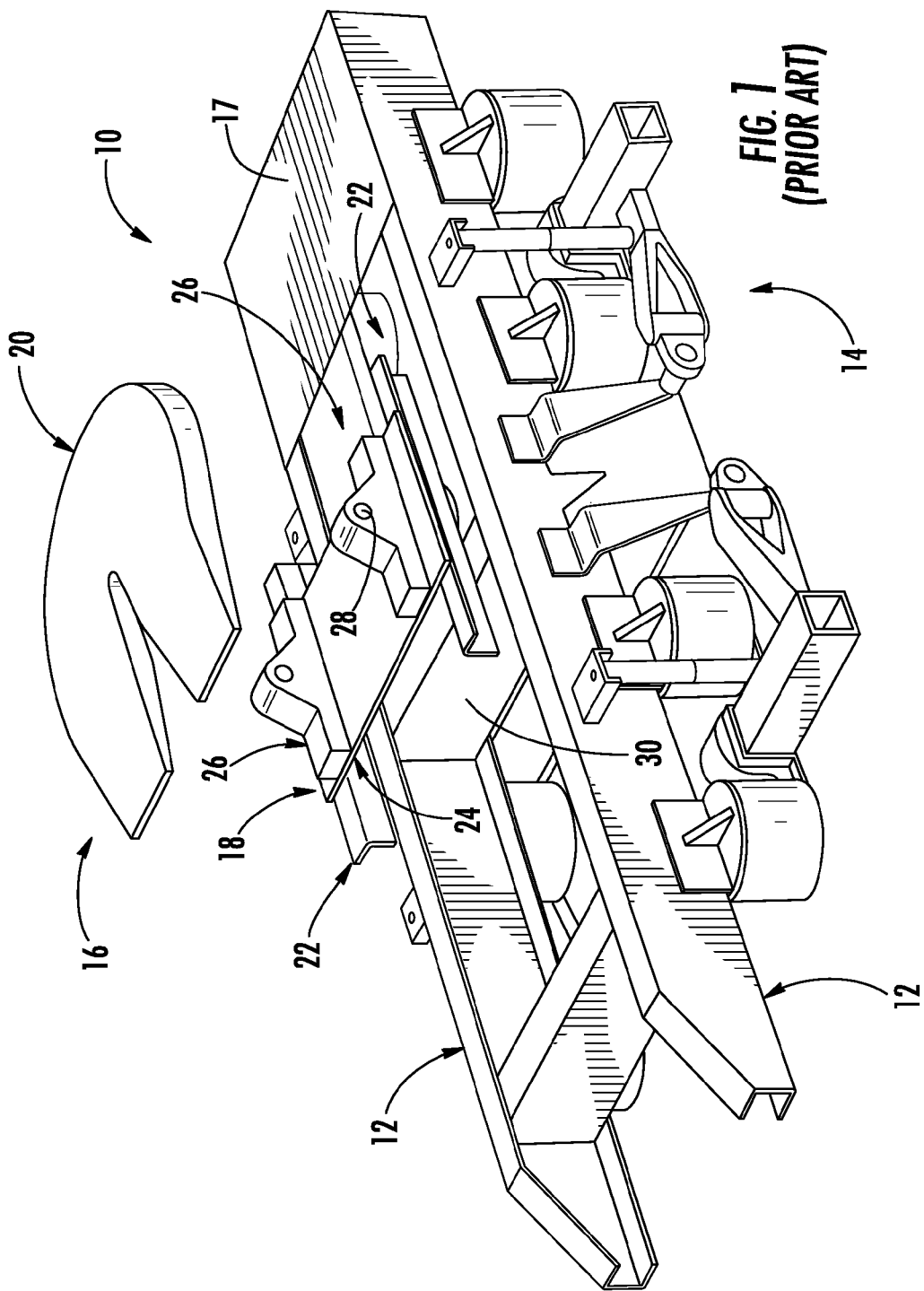
FIG. 1 is an exploded perspective view of a prior art fifth wheel mounting system.
Figure 2:
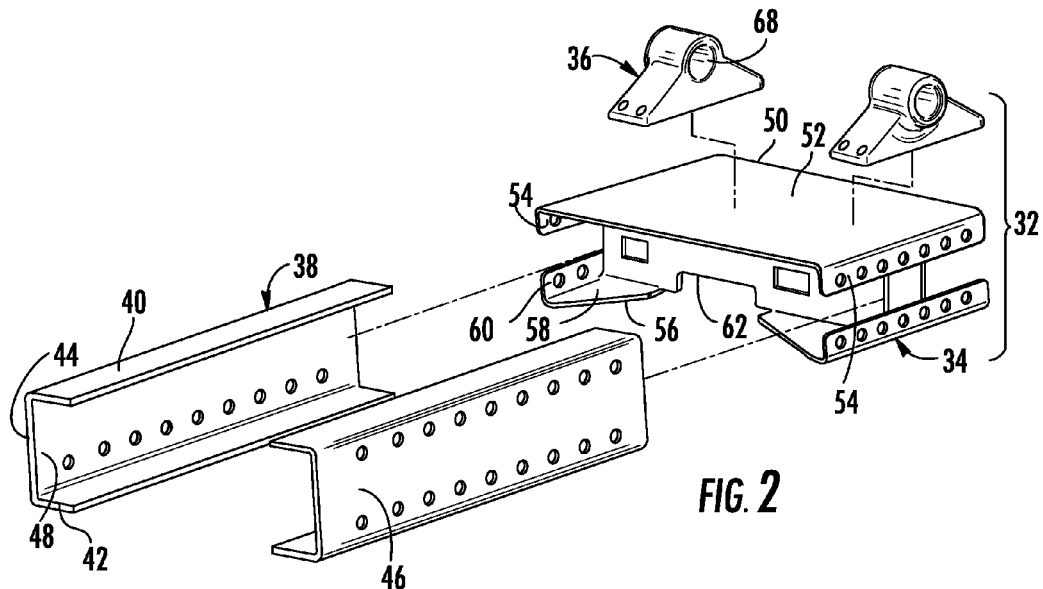
FIG. 2 is an exploded view of a first embodiment of a fifth wheel mounting assembly embodying the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 32 (FIGS. 2 and 3) generally designates a fifth wheel mounting assembly embodying the present invention. In the illustrated example, the fifth wheel mounting assembly 32 includes a carriage assembly 34 supporting a pair of mounting brackets 36 from a pair of vehicle frame rails 38. Each of the vehicle frame rails 38 is provided a C-shaped cross-sectional configuration and includes an upper horizontal portion 40, a lower horizontal portion 42 and a vertical portion 44 extending between and connecting the upper horizontal portion 40 and the lower horizontal portion 42. Each vertical portion 44 includes an outwardly facing surface 46 and an inwardly facing surface 48.

The carriage assembly 34 includes an upper support member 50 having a planar mounting portion 52 and a pair of downwardly extending flanges 54 located at each edge of the mounting portion 52. The carriage assembly 34 further includes a pair of lower support members 56 each including an inwardly extending mounting portion 58 and an upwardly extending flange 60. The carriage assembly 34 further includes a cross-member 62 extending laterally between the frame rails 38 and secured to the upper support member 50 and the lower support members 56. The flanges 54 of the upper support member 50 and the flanges 60 of the lower support members 56 each include a plurality of longitudinally spaced apertures 64 that align with apertures 66 longitudinally spaced along the frame rails 38 and that are adapted to receive mechanical fasteners (not shown) therein, thereby securing the carriage assembly 34 to the inwardly facing surface 48 of each of the frame rails 38. The mounting brackets 36 are secured to an upper surface of the mounting portion 52 of the upper support member 50. Each mounting bracket 36 includes an inwardly exposed aperture 68 adapted to receive a mounting pin therein, so as to pivotally mount a fifth wheel hitch plate (not shown) to the carriage assembly 34.

The reference numeral 32a (FIG. 4) generally designates another embodiment of the present invention. Since the fifth wheel mounting assembly 32a is similar to the previously described fifth wheel mounting assembly 32, similar parts appearing in FIGS. 2 and 3 and FIG. 4 respectfully are represented by the same, corresponding reference numeral, except for the suffix "a" in the numerals of the latter. The fifth wheel mounting assembly 32a is similar to the fifth wheel mounting assembly 32 with the most notable exception being the replacement of the upper support member 50 with a pair of upper support members 70 each including a mounting portion 72 and a downwardly extending flange 74. In assembly, the mounting brackets 36a are secured to an upper surface of the mounting portion 72 of the respective upper support member 70. In the illustrated example, the mounting portion 58a of each of the lower support members 56a and the mounting portion 72 of each of the upper support members 70 are each provided with three rows of longitudinally spaced apertures 76 that receive mounting bolts 78 therein, thereby securing the lower support members 56 and the upper support members 70 to the cross member 62a. The offset nature of each of the rows of apertures 76 allows the adjustment of each of the lower support members 56a and the upper support members 70 in a fore and aft direction 79 with respect to the associated cross member 62a along reconfiguration of the carriage assembly 34a for particular applications.

Figure 4:
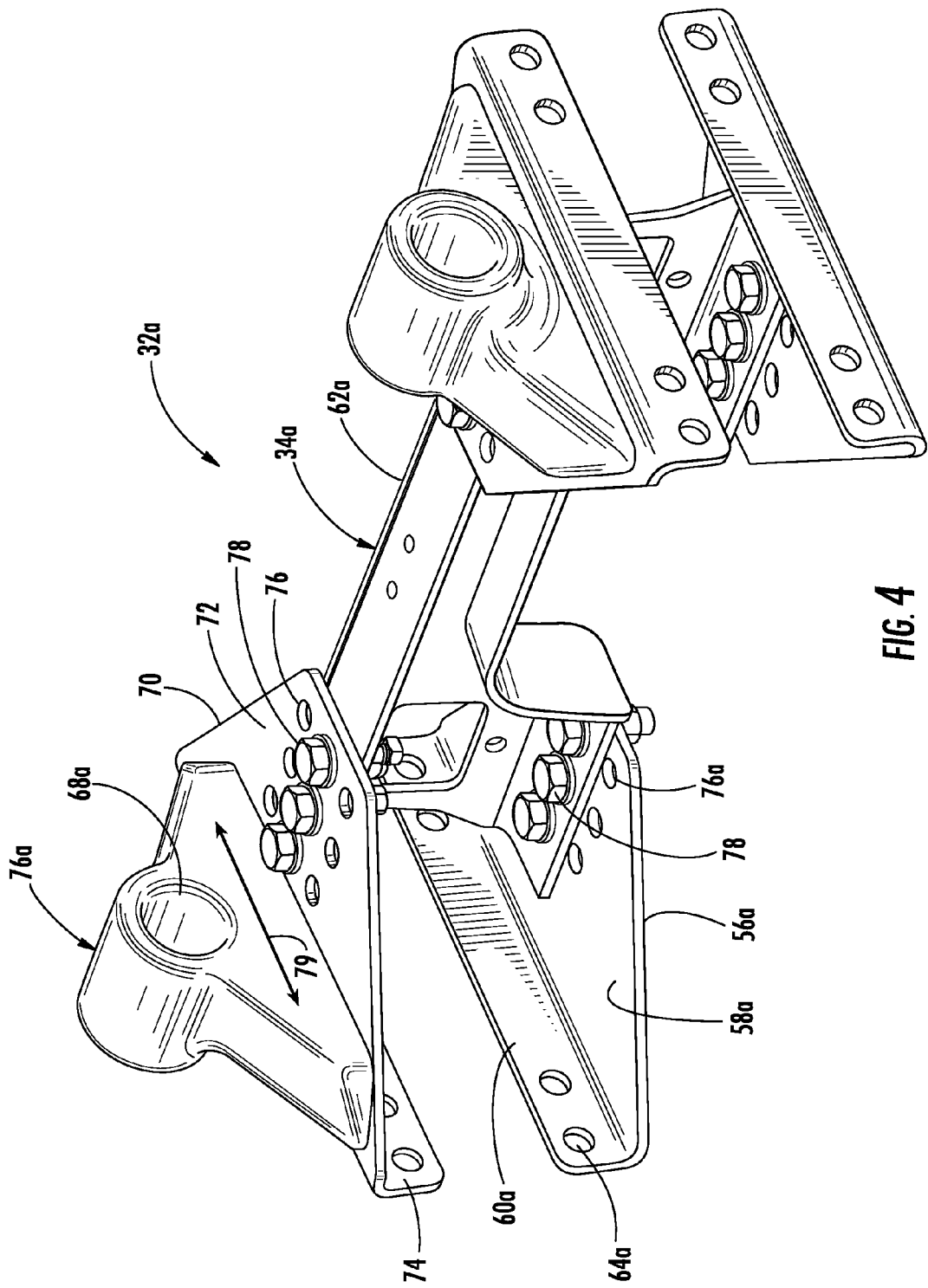
FIG. 4 is a perspective view of a second embodiment of the fifth wheel mounting assembly.
Figure 5:
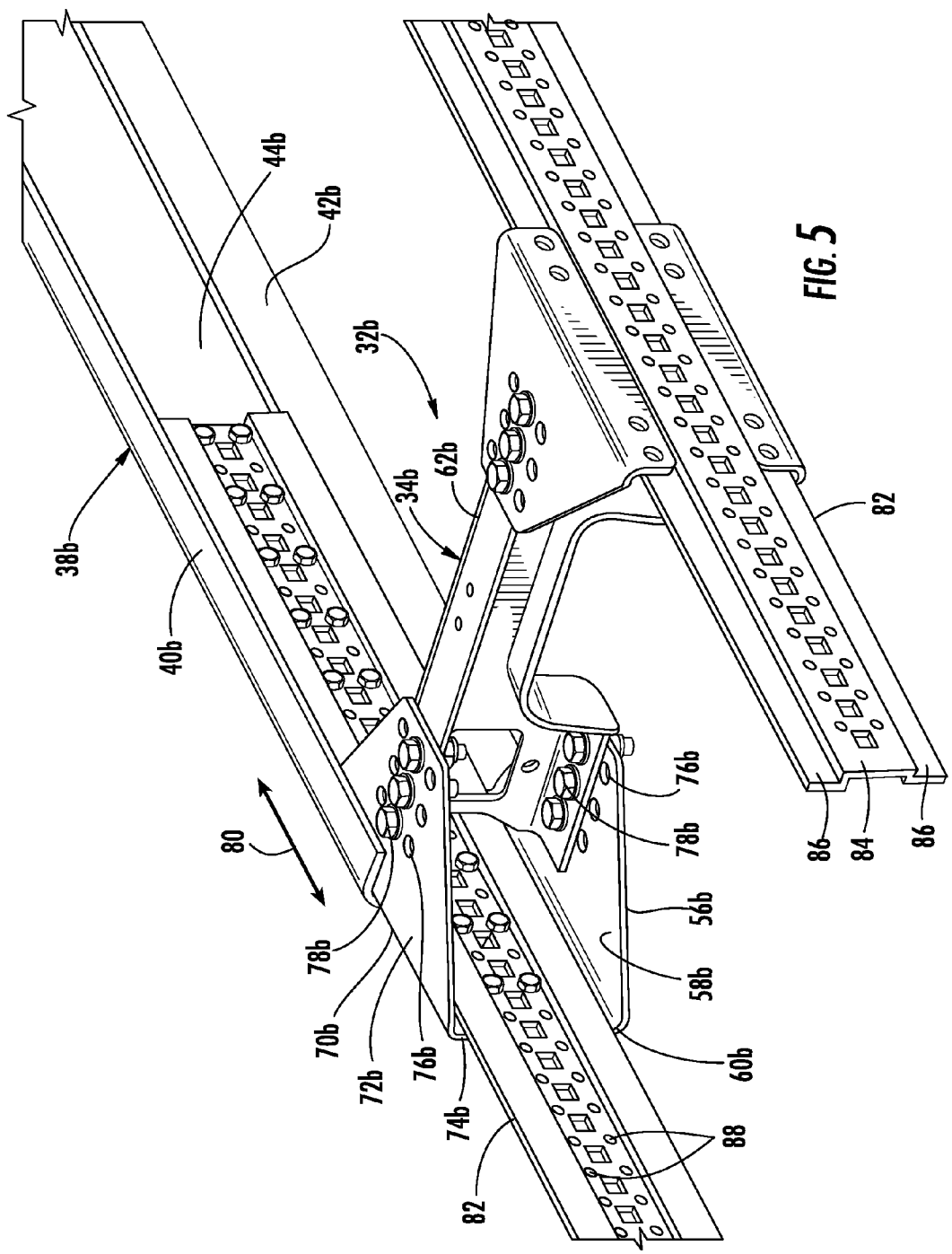
FIG. 5 is a perspective view of the second embodiment of the mounting assembly illustrated in assembly with frame members and rail members.
Figure 6:
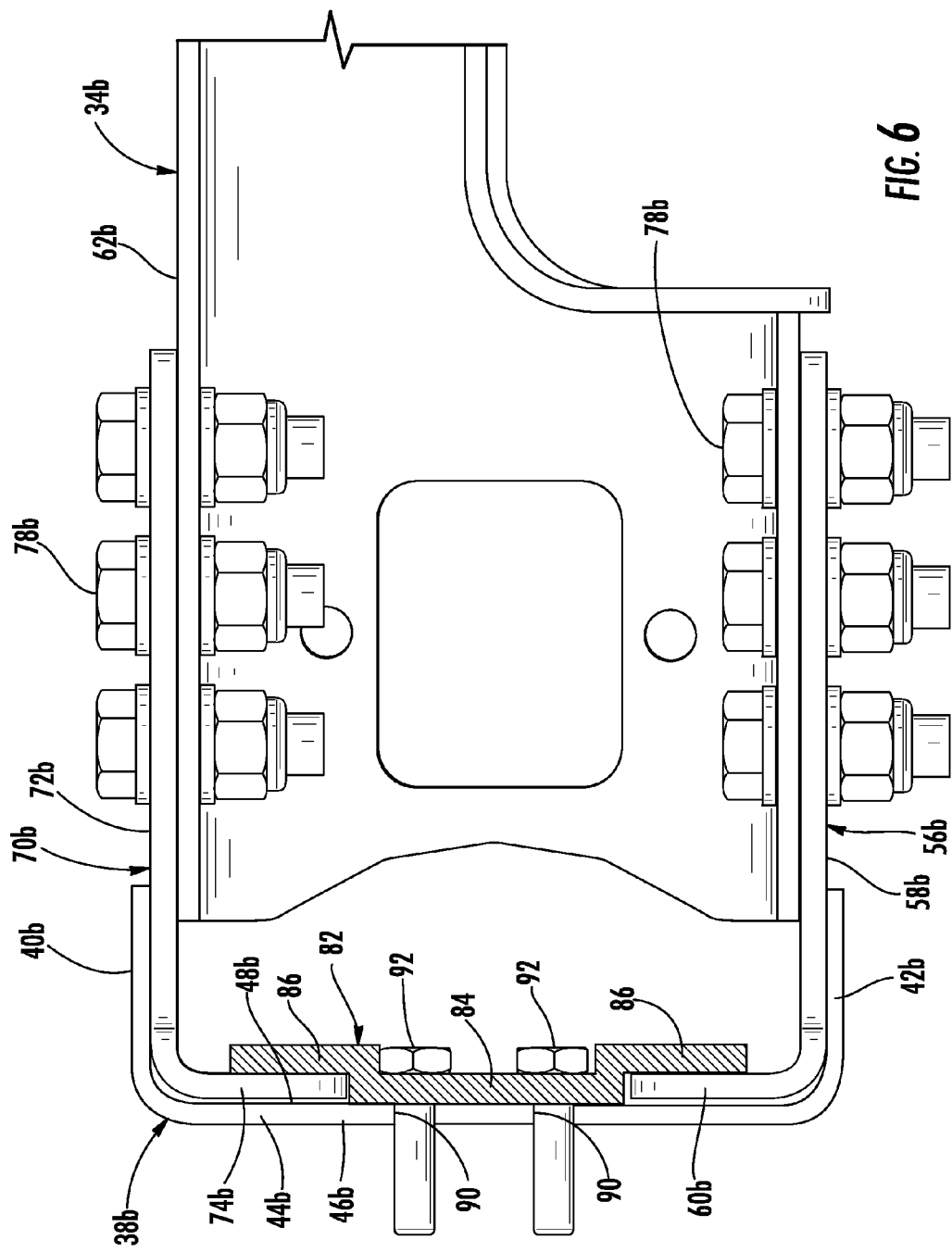
FIG. 6 is a partial end view of the second embodiment of the fifth wheel mounting assembly.
Figure 7A:
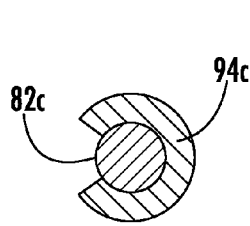
FIG. 7a is a cross-sectional end view of a first embodiment of a rail member and a carriage assembly of a fifth wheel mounting assembly.
Figure 7B:
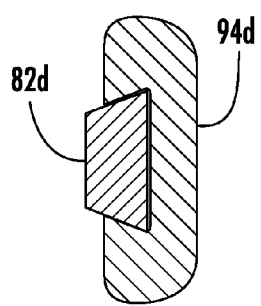
FIG. 7b is a cross-sectional end view of a second embodiment of a rail member and a carriage assembly.
Figure 7C:
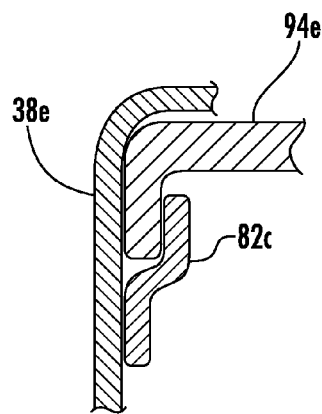
FIG. 7c is a cross-sectional end view of a third embodiment of a rail member and a carriage assembly.
Figure 7D:
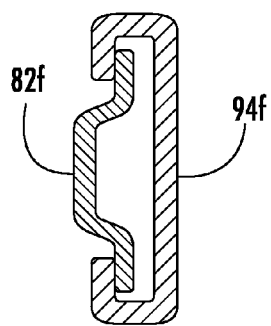
FIG. 7d is a cross-sectional end view of a fourth embodiment of a rail member and a carriage assembly.

The reference numeral 32b (FIGS. 5 and 6) generally designates another embodiment of the present invention, having a fifth wheel mounting assembly. Since the fifth wheel mounting assembly 32b is similar to the previously described fifth wheel mounting assembly 32a, similar parts appearing in FIG. 4 and in FIGS. 5 and 6 are respectfully represented by the same, corresponding reference numeral, except for the suffix "b" in the numerals of the latter. In the illustrated example, the fifth wheel mounting assembly 32b includes a carriage assembly 34b that is longitudinally repositionable in a direction 80 relative to the associated frame rails 38b. The fifth wheel mounting assembly 32b is similar to the fifth wheel mounting assembly 32a previously described, with the most notable exception being the inclusion of a pair of rail members 82 that extend longitudinally along the vehicle frame rails 38b and are secured to the inwardly facing surface 48b of the vertical portion 44b of the corresponding frame rail 38b. Specifically, each rail member 82 is provided with a hat-shaped cross-sectional configuration and includes a planar body portion 84, and a pair of planar flange portions 86 juxtaposed across and extending longitudinally along the body portion 84, and inwardly offset therefrom. The body portion 84 includes a pair of rows of longitudinally offset apertures 88, while the frame rails 38b include a pair of longitudinally spaced apertures 90 each adapted to receive bolts 92 therein, thereby securing the rail members 82 to the associated frame rails 38b. In assembly, the flange 60b of each of the lower support members 56b and the flange 74b of each of the upper support members 70b are trapped between the inwardly facing surface 48b of the vertical portion 44b of the associated frame rail 38b and the flange portion 86 of the associated rail member 82, thereby securing the carriage assembly 34b at a particular location along the length of the vehicle frame rails 38b.

As best illustrated in FIGS. 7a-7f, the rail member and carriage assembly may be provided in various cooperating geometrical configurations. Specifically, the flange portions of the upper and lower support members of the carriage assembly may be replaced with various geometrical configurations that cooperate with corresponding configurations of the rail members. For example, each of the rail members 82c (FIG. 7a) may be provided with a circular cross-sectional configuration, and the flange portion of either of the upper or lower support members replaced with a C-shaped engagement portion 94c; a rail member 82d (FIG. 7b) having a trapezoidal cross-sectional configuration with a corresponding engagement portion 94d; a rail member 82e (FIG. 7c) having a Z-shaped cross-sectional configuration with an L-shaped engagement portion 94e; a rail member 82f (FIGS. 7d and 7e) cooperating with a C-shaped engagement portion 94f; and, cooperating rail member 82e (FIG. 7f) fixed to a vertical portion 44f of an associated frame member, and between which an engagement portion of a carriage assembly (not shown) is received.

Figure 3:
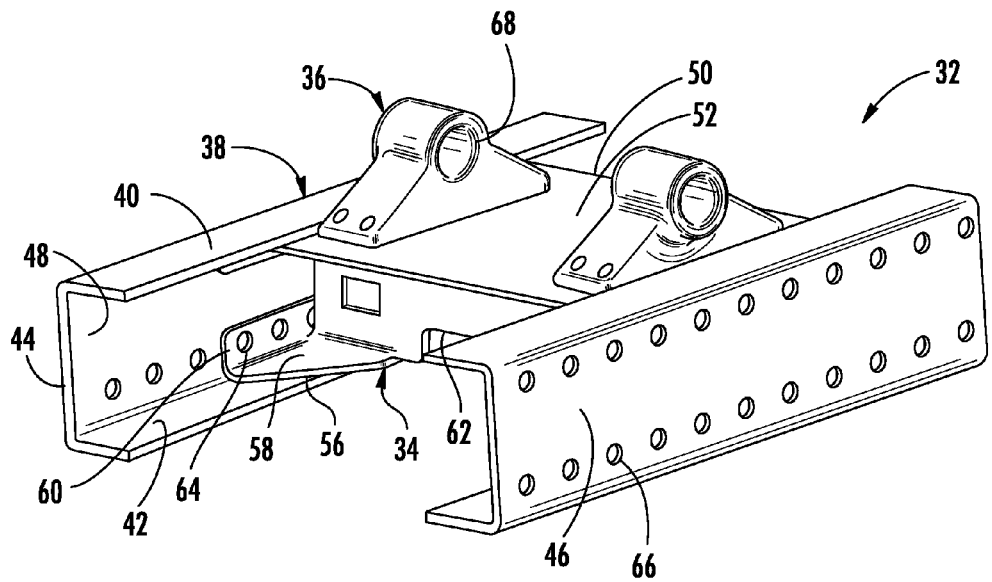
FIG. 3 is a perspective view of the first embodiment of the fifth wheel mounting assembly.
Figure 8:
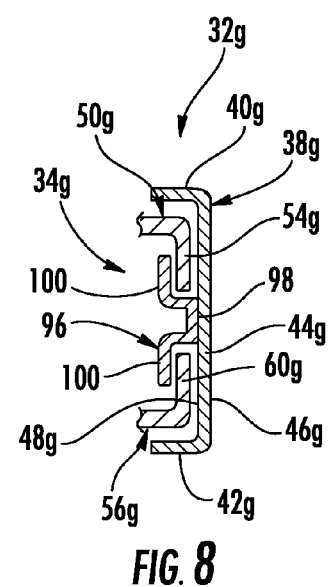
FIG. 8 is a partial perspective view of a third embodiment of the fifth wheel mounting assembly.
Figure 7E:
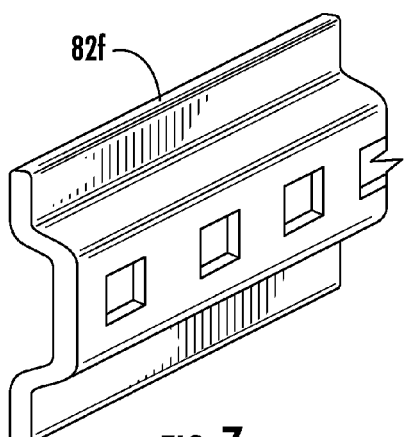
FIG. 7e is a partial perspective view of the fourth embodiment of the rail member.
Figure 7F:
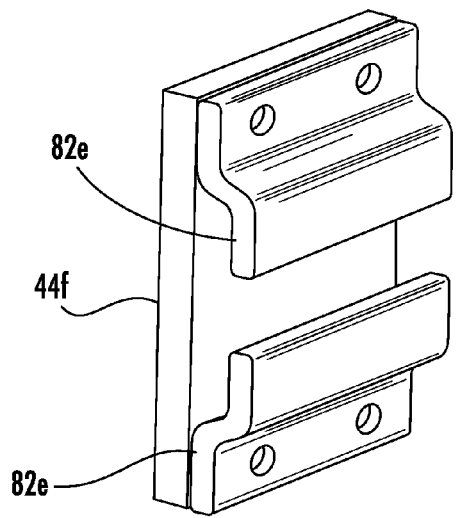
FIG. 7f is a partial perspective view of a fifth embodiment of a rail member secured to an associated vehicle frame rail.

The reference numeral 32g (FIG. 8) generally designates yet another embodiment of the present invention having a fifth wheel mounting assembly 32g. Since the fifth wheel mounting assembly 32g is similar to the previously described fifth wheel mounting assemblies 32, 32a, 32b, similar parts appearing in FIGS. 2-6 and in FIG. 8 are respectfully represented by the same, corresponding reference numeral, except for the suffix "g" in the numerals of the latter. In the illustrated example, the fifth wheel mounting assembly 32g includes a carriage assembly 34g that includes an upper support member 50g and a lower support member 56g having flange 54g and flange 60g, respectively. An adaptor rail 96 extends longitudinally along the associated frame rail 38f and includes a body portion 98 and a pair of flange portions 100 that extend longitudinally along and are juxtaposed across the body portion 98a, and are offset inwardly therefrom. In assembly, the body portion 98 of the adaptor rail 96 is secured to the inwardly facing surface 48f of the frame rail 38f and secures the carriage assembly 34f with respect to the associated frame rail 38f. The adaptor rail 96 may be used in conjunction with stationary systems, as illustrated in FIGS. 2-4, and longitudinally repositionable assemblies, as illustrated in FIGS. 5 and 6.

Figure 9:
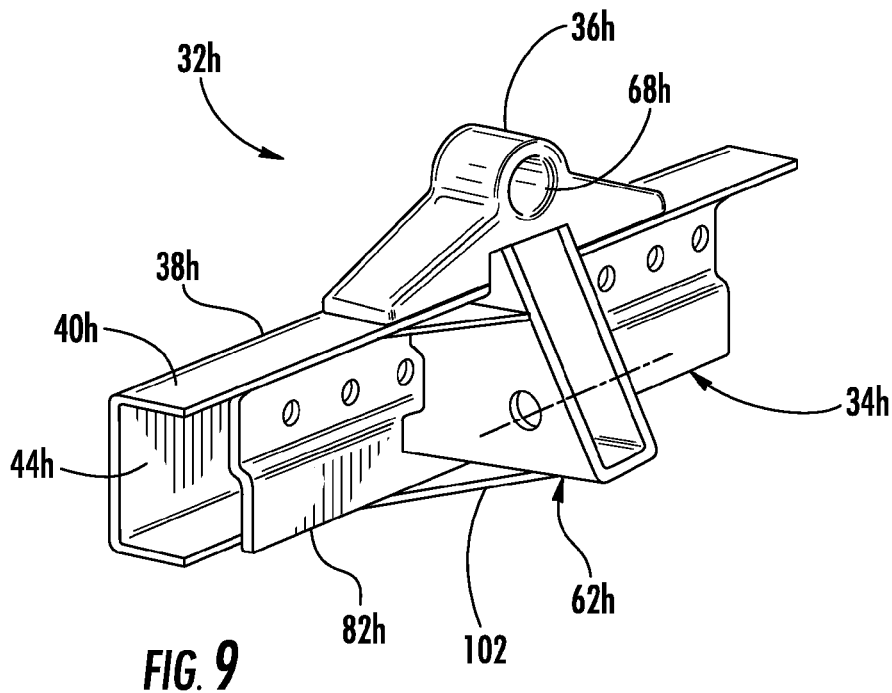
FIG. 9 is a partial perspective view of a fourth embodiment of the fifth wheel mounting assembly.

The reference numeral 32h (FIG. 9) generally designates another embodiment of the present invention having a fifth wheel mounting assembly. Since the fifth wheel mounting assembly 32h is similar to the previously described fifth wheel mounting assembly 32b, similar parts appearing in FIGS. 5 and 6 and in FIG. 9 are respectfully represented by the same, corresponding reference numeral, except for the suffix "h" in the numerals of the latter. In the illustrated example, the carriage assembly 34h includes a multiple-piece cross member 62h of which end portion 102 is illustrated, and which is described in further detail below. The end portion 102 is configured to cooperate and couple with the associated rail member 82h. As illustrated, the mounting bracket 36h is secured to the end portion 102 of the cross member 62h such that the mounting bracket 36h is positioned vertically above the upper horizontal portion 40h of the associated frame rail 38h.

Figure 10:
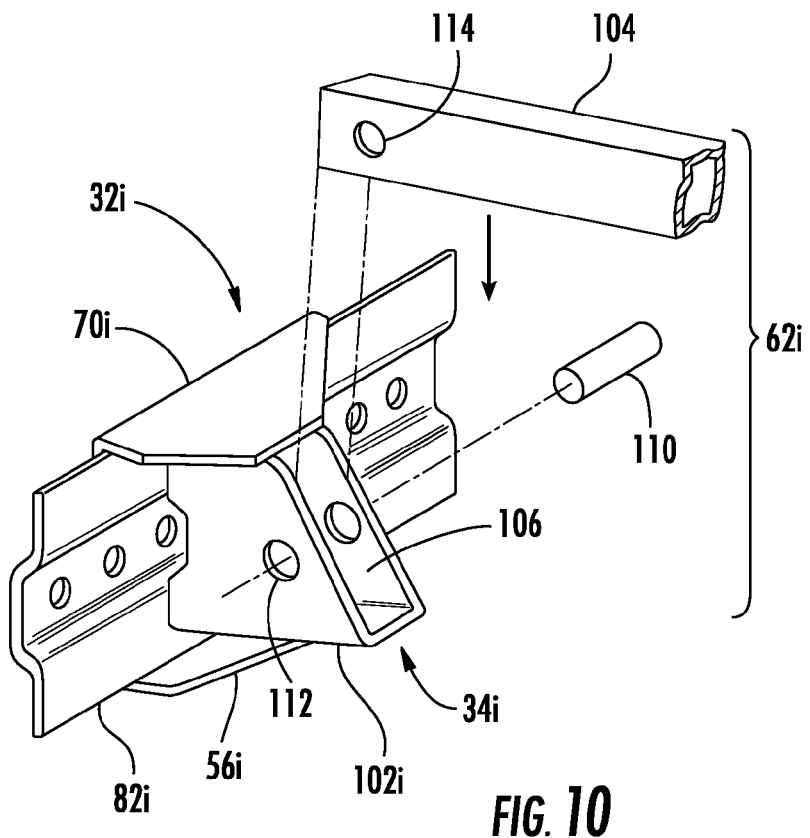
FIG. 10 is an exploded partial perspective view of a fifth embodiment of the fifth wheel mounting assembly.

The reference numeral 32i (FIG. 10) generally designates another embodiment of the present inventive fifth wheel mounting assembly. Since the fifth wheel mounting assembly 32i is similar to the previously described fifth wheel mounting assembly 32h, similar parts appearing in FIG. 9 and FIG. 10 are respectfully represented by the same, corresponding reference numeral, except for the suffix "i" in the numerals of the latter. In the illustrated example, the fifth wheel mounting assembly 32i includes a carriage assembly 34i that includes a multiple-piece cross member 62i. The cross member 62i includes a first end portion 102i, a second end portion (not shown) and a center portion 104 extending between and secured to each of the end portions. Each of the end portions 102 include a receiving pocket 106 within which the distal ends of the center portion 104 are received. The distal ends of the center portion 104 are secured within the pocket 106 of each of the end portions 102 by separate or integrated fasteners. In the illustrated example, a separate fastener 110 is received within apertures 112 of the end portions 102 and apertures 114 of the center portion 104, thereby securing the center portion 104 to the end portions 102.

In the foregoing description, it will be readily appreciated by those skilled in the art that modifications may be made to the invention without departing from the concepts as disclosed herein. Such modifications are to be considered as included in the following claims, unless these claims by their express language state otherwise.

The invention claimed is:

1. A fifth wheel mounting assembly for mounting a fifth wheel hitch plate to a vehicle frame assembly including a first frame member having a substantially vertically extending mounting portion with an outwardly facing surface and an inwardly facing surface, and a second frame member having a substantially vertically extending mounting portion with an outwardly facing surface and an inwardly facing surface, the fifth wheel mounting assembly comprising:
    a first rail member adapted to couple to the inwardly facing surface of the mounting portion of the first frame member of the vehicle frame assembly;
    a second rail member adapted to couple to the inwardly facing surface of the mounting portion of the second frame member of the vehicle frame assembly;
    a first support member adapted to be slidably coupled between the first rail member and the inwardly facing surface of the first frame member;
    a second support member adapted to be slidably coupled between the second rail member and the inwardly facing surface of the second frame member;
    a cross member extending between and coupled to the first support member and the second support member;
    a first mounting bracket coupled to the first support member and including an inwardly exposed aperture adapted to receive a mounting pin therein for pivotably coupling a fifth wheel hitch plate to the first mounting bracket; and
    a second mounting bracket coupled to the second support member and including an inwardly exposed aperture adapted to receive a mounting pin therein for pivotably coupling the fifth wheel hitch plate to the second mounting bracket.

2. The fifth wheel mounting assembly of claim 1, further including:
    a third support member adapted to be slidably coupled between the first frame rail and the inwardly facing surface of the first frame member, and slidably coupled between the second frame rail and the inwardly facing surface of the second frame member, wherein the third support member is coupled to the cross member.

3. The fifth wheel mounting assembly of claim 1, further including:
    a third support member adapted to be slidably coupled between the first frame rail and the inwardly facing surface of a first frame member; and
    a fourth support member adapted to be slidably coupled between the second frame rail and the inwardly facing surface of a second frame member, wherein the third support member and the fourth support member are each coupled to the cross member.

4. The fifth wheel mounting assembly of claim 1, wherein first and second rail members each have a cross-sectional configuration of at least a select one of circular, trapezoidal, Z-shaped and hat-shaped.

5. The fifth wheel mounting assembly of claim 1, wherein the first rail member and the second rail member each include a plurality of longitudinally-space apertures extending therethrough, and wherein the apertures are adapted to receive mechanical fasteners therethrough to secure the first rail member to the first frame member and the second rail member to the second frame member.

6. The fifth wheel mounting assembly of claim 1, further including:
    an adaptor bracket that extends longitudinally along the first rail member and is adapted to couple the first rail member with the inwardly facing surface of the first frame member of the vehicle frame assembly.

7. The fifth wheel mounting assembly of claim 1, wherein the first mounting bracket is adapted to be at least partially vertically aligned with the first frame member of the vehicle assembly.

8. The fifth wheel mounting assembly of claim 1, wherein the cross member includes a first end portion, a second end portion and a center portion extending between and detachably coupled to the first end portion and the second end portion.

9. A fifth wheel mounting assembly for mounting a fifth wheel hitch plate to a vehicle frame assembly including a first frame member having a substantially vertically extending mounting portion with an outwardly facing surface and an inwardly facing surface, and a second frame member having a substantially vertically extending mounting portion with an outwardly facing surface and an inwardly facing surface, the fifth wheel mounting assembly comprising:
    a first rail member adapted to couple to the inwardly facing surface of the mounting portion of the first frame member of the vehicle frame assembly;
    a second rail member adapted to couple to the inwardly facing surface of the mounting portion of the second frame member of the vehicle frame assembly;
    a first support member adapted to be slidably coupled between the first rail member and the inwardly facing surface of the first frame member;
    a second support member adapted to be slidably coupled between the second rail member and the inwardly facing surface of the second frame member, wherein the second support member is not directly coupled with the first support member by a cross member;
    a first mounting bracket coupled to the first support member and including an inwardly exposed aperture adapted to receive a mounting pin therein for pivotably coupling a fifth wheel hitch plate to the first mounting bracket; and
    a second mounting bracket coupled to the second support member and including an inwardly exposed aperture adapted to receive a mounting pin therein for pivotably coupling the fifth wheel hitch plate to the second mounting bracket.

10. The fifth wheel mounting assembly of claim 9, wherein first and second rail members each have a cross-sectional configuration of at least a select one of circular, trapezoidal, Z-shaped and hat-shaped.

11. The fifth wheel mounting assembly of claim 9, wherein the first rail member and the second rail member each include a plurality of longitudinally-space apertures extending therethrough, and wherein the apertures are adapted to receive mechanical fasteners therethrough to secure to the first rail member to the first frame member and the second rail member to the second frame member.

12. The fifth wheel mounting assembly of claim 9, further including:
    an adaptor bracket that extends longitudinally along the first rail member and is adapted to couple the first rail member with the inwardly facing surface of the first frame member of the vehicle frame assembly.

13. The fifth wheel mounting assembly of claim 9, wherein the first mounting bracket is adapted to be at least partially vertically aligned with the first frame member of the vehicle assembly.

* * * * *